TRAFFIC SIGNAL DEVICE

Filed Dec. 23, 1959 8 Sheets-Sheet 1

INVENTOR
LAWRENCE LAWTON
BY Hammond & Littell
ATTORNEYS

July 14, 1964 L. LAWTON 3,141,149

TRAFFIC SIGNAL DEVICE

Filed Dec. 23, 1959 8 Sheets-Sheet 2

INVENTOR
LAWRENCE LAWTON
BY Hammond & Littell
ATTORNEYS

July 14, 1964 L. LAWTON 3,141,149

TRAFFIC SIGNAL DEVICE

Filed Dec. 23, 1959 8 Sheets-Sheet 3

INVENTOR
LAWRENCE LAWTON
BY
Hammond & Littell
ATTORNEYS

INVENTOR
LAWRENCE LAWTON
BY Hammond & Littell
ATTORNEYS

INVENTOR
LAWRENCE LAWTON
BY
Hammond & Littell
ATTORNEYS

INVENTOR
LAWRENCE LAWTON
BY
ATTORNEYS

INVENTOR
LAWRENCE LAWTON
BY
ATTORNEYS

Fig. 18
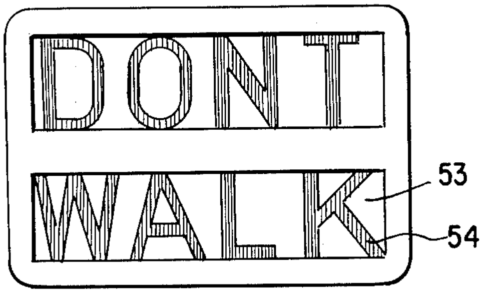
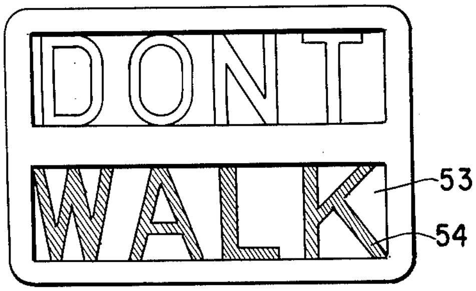
Fig. 19
Fig. 20
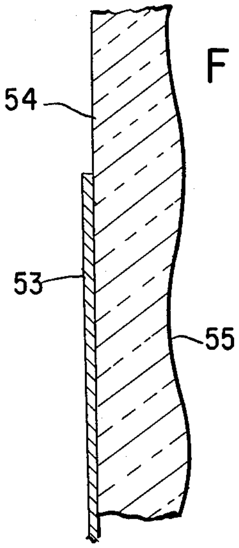
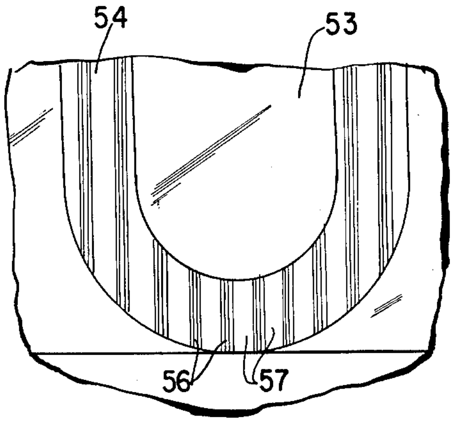
Fig. 21
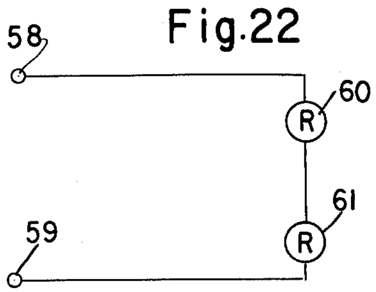
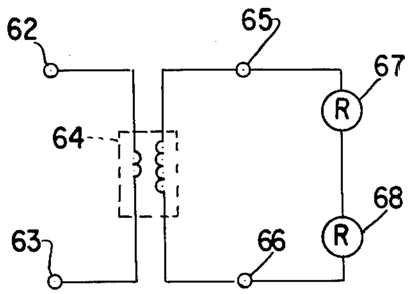
Fig. 23
INVENTOR
LAWRENCE LAWTON
BY
ATTORNEYS 3,141,149
TRAFFIC SIGNAL DEVICE
Lawrence Lawton, 150—47 Village Road, Jamaica 32, N.Y.
Filed Dec. 23, 1959, Ser. No. 861,583
25 Claims. (Cl. 340—44)

This invention relates to a visual traffic signal and more particularly to a traffic signal for pedestrian control at street intersections.

There has been a long existing need for a device to control pedestrian traffic on street intersections so that pedestrians will cross the streets at the proper time and not in conflict with the vehicular traffic or the traffic light signals for controlling vehicular traffic. Such pedestrian control signals should be synchronized with the vehicular traffic control signals and should have a means to indicate to pedestrians the proper time for crossing.

Efforts have been made in the past for the development of suitable pedestrian control devices. In one example, a traffic light housing was used containing a spherical parabolic reflector and an incandescent light bulb with the word "Wait" on one stencil glass and "Walk" on another stencil glass in a second housing. In another example, red neon tubing was formed into the letters "Don't Walk" wherein the "Don't Walk" was lighted during the prohibitory period and a separate "Walk" of a second color was lit during the permissive period. A more recent example of a pedestrian signal uses red and green neon tubing grids and the words "Don't" and "Walk" in front of different compartments. During the prohibitory period, the red neon tubing grid in both compartments causes both the words "Don't Walk" to be illuminated. During the permissive period only the word "Walk" was illuminated in the green color by the neon tubing grid placed in this compartment.

While all of these measures give some degree of traffic control, they have various disadvantages. None of those referred to makes the most efficient use of the light energy. In the first instance, the spherical parabolic reflector placed in a square housing results in the loss of a large amount of the reflecting surface due to the cutting off of the reflector to fit into the square housing. Moreover, diffusing stencil plates are generally used in this type of control which scatter the light flux. In the type of sign formed by neon tubing bent into letters, the width of stroke of a letter is limited to the diameter of the neon tubing. In the control device making use of red and green neon tubing grids, there is no attempt to control the light flux. Thus, the horizontal spread of the light is quite wide and can give a dangerous green indication to drivers proceeding along the path parallel to the signal face. Although there is a need for a satisfactory pedestrian signal to be used in conjunction with vehicular signals at traffic intersections, no such signal has been developed up to the present time.

It is an object of my invention to provide a vehicular pedestrian signal making efficient use of the light source.

It is a further object of my invention to provide a pedestrian traffic signal wherein the field of view of the light signal may be controlled within definite limits.

It is a further object to provide a pedestrian signal which is adequately protected from weather and yet has all parts readily accessable for maintenance.

A further object of my invention is to provide a traffic signal having uniform intensity of light on the stencil faces and which is plainly visible from a long distance.

Another object is to provide a traffic signal having the words "Don't Walk" illuminated on the face of the signal in which the words "Don't Walk" are illuminated in one color during one time interval and the same word "Walk" is illuminated by another color during another time interval.

These and other objects and advantages of my invention will become apparent as this description proceeds. I have discovered that the above objects may be attained and the deficiencies of the prior art traffic signals overcome by the use of my novel traffic signal herein described in which I obtain maximum light efficiency with the use of elongated parabolic reflector together with a linear light source which is placed at or near the focus of the parabolic curve and runs parallel to the surface. By the use of a parabolic reflector surface, light rays are directed forward and against the stencil face in a controlled manner.

I have found it desirable that the parabolic surface should be elongated rather than spherical since this makes possible the use of a greater surface area having a parabolic curve and the obtaining of increased light intensity. This is also especially satisfactory since the stencil to be illuminated is itself substantially rectangular or square in shape. Thus, the constant parabolic section reflector combination with a linear light source results in a most efficient utilization of light of the reflector and the maximum intensity and uniformity of light on the stencil face.

For use in pedestrian control, the minimum field of view for the pedestrian signal should be about 30° horizontal coverage and about 15° vertical coverage. For use of the device in vehicular control (for example as in a "No Left Turn" sign) the coverage would be greater in both planes.

I have found that the spread of light with a horizontal plane parabolic reflector is extremely wide in the horizontal direction. I have further found that a vertical plane parabolic reflector may be used with a vertical line light source. In order to obtain a proper reflector backing for a rectangular stencil which is elongated in the horizontal direction, the vertical plane reflector is extended in the horizontal dimension and reduced in the vertical dimension. In order to obtain efficient beam spread of the light flux through the rectangular light stencil, I make use of a linear type light source. Light emitters in a tubular envelope function well as a source of linear type light. For this tubular light source there may be used incandescent bulbs with a heavy frosting or a heavy white coating or colored enamel coating or fluorescent and cold cathode lamps and also neon tubing. A light source elongated along a major axis such as a coated type "A" incandescent bulb or a mercury vapor lamp may also be used as a somewhat less efficient source of linear type light. The spread of the light beam may be further controlled by the use of a parabolic reflector made of a series of connected flat plane surfaces parallel to the linear type light source. In place of plane surfaces, curved or other configurated surfaces may also be used. A reflecting cover or covers can be fitted across the curved edges of the parabolic reflector and the socket for the light source may be attached to one or both of these reflector surfaces.

In the complete traffic signal, for example the signal using the words "Don't Walk," two reflector units as described are mounted one above the other in a rectangular housing in such a manner that they are hinged at one side. The cover for the rectangular housing is hinged on the lower front edge. The cover contains two transparent stencil areas of rectangular shape, one above the other, with the word "Don't" on the top stencil and "Walk" on the bottom stencil. In the top reflector unit, a red light source is placed at the focus of the parabolic reflector. In the bottom reflector unit a red light source is likewise placed at the focus of the parabolic surface. These lights illuminate the "Don't Walk" words during the prohibitory period. During the permissive period the red bulbs are not lighted and the "Walk" stencil is illuminated by green bulbs which are in the lower reflector unit. These green bulbs may be placed one in front of the red bulb and one in the back of the red bulb. I have found it desirable to use two green bulbs, to obtain uniform distribution of the light flux of the stencil area, when the light source is not located at the focus of the parabolic reflector surface and the reasons for this will be more fully explained later.

It is possible using any of the methods previously described to achieve the desired beam spread through a stencil. In conjunction with these methods, the stencil used may be a spread, diffused, or clear colored glass or plastic cover glasses, as well as clear uncolored sheet glass or plastic. For example, if it were desired to precisely spread the vertical component of the light flux resulting from a vertical parabolic reflector without affecting the horizontal component, this is accomplished by configurated glass or plastic made with horizontal ribs or flutes. In most cases the stencil is painted directly on the glass or plastic cover glass.

With the use of various types of stencil glass, a number of effects are obtained. I can obtain a sparkle effect by the use of an undulating or ribbed pattern in the stencil glass. The pattern causes distortion of the images emanating from a configured parabolic reflector as seen by a moving observer resulting in the sparkling effect. In like manner, a series of opaque bands on a stencil will cause a heterodyne interference of the specular images of the light source when viewed by a moving observer. This creates a scintillating effect on the message stencil which stops when the observer stops moving. Such an effect can be a valuable psychological tool in traffic control applications.

Preferred embodiments of my invention are illustrated in the accompanying drawings in which FIGURE 1 illustrates a front view of the traffic signal broken at the mid point and illustrating specifically the front cover and stencil plates.

FIGURE 18 shows a front elevation of the message panel of the signal showing both "Don't" and "Walk" illuminated in red.

FIGURE 19 is a similar view showing "Don't" unilluminated and "Walk" illuminated in green.

FIGURE 20 illustrates an enlarged, sectional, fragmentary detail of the message panel showing the opaque coating of the stencil placed on the surface of the clear lens.

FIGURE 21 is a front elevation of the lower portion of the letter "O" of the message panel showing the use of parallel opaque bands in the transparent stroke portions of the message stencil.

FIGURE 22 shows the red light bulb of the upper reflector connected in series to the red light bulb of the lower reflector, across a source of line voltage.

FIGURE 23 shows the red light bulb of the upper reflector connected in series to the red light bulb of the lower reflector, across the output of a transformer feeding from line voltage.

Figures 1, 2:
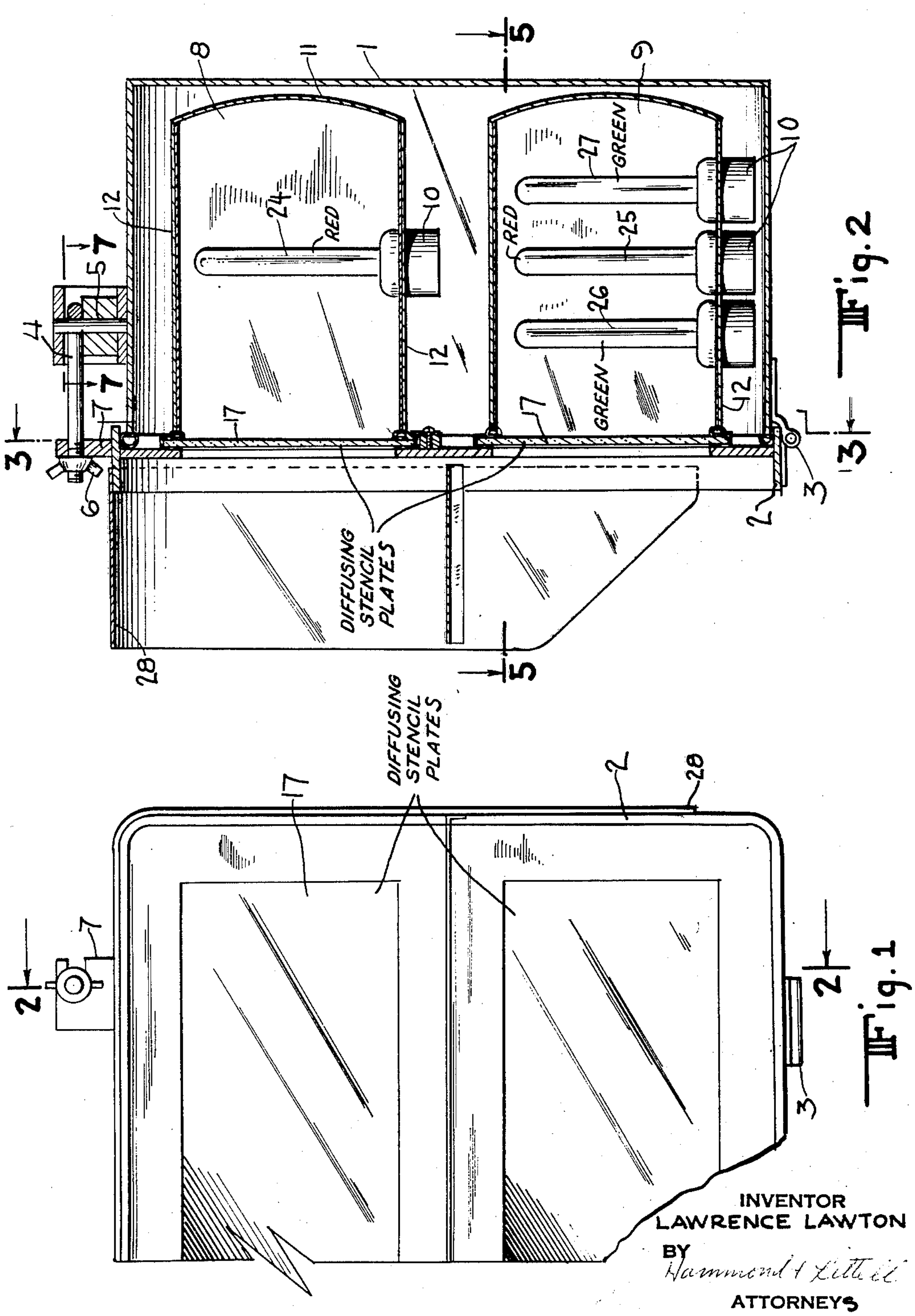
FIGURE 2 represents a cross section of the traffic signal taken along the lines 2—2 of FIGURE 1 illustrating the reflector units and the outside housing.

Referring to the drawings for a more detailed description of my improved traffic light, the case consists of a rectangular housing or box 1, open at the front and a cover 2 for closing the front side of the case. Cover 2 is pivoted at its lower edge by hinges 3 and is closed at the top edge by draw bolts 4, pivoting horizontal on vertical posts 5 attached to housing 1, and having wing nuts 6 which engage ears 7 attached to front cover 2.

Figure 4:
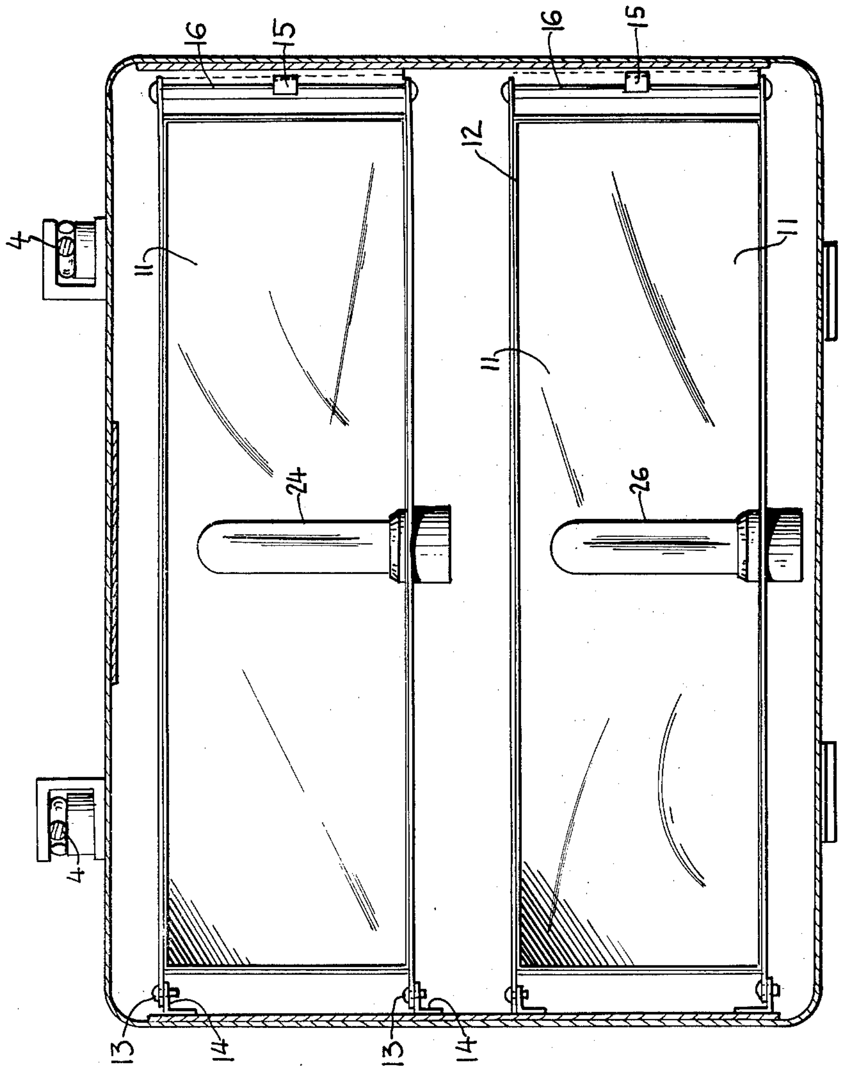
FIGURE 4 represents a front cross sectional view taken along the lines 4—4 of FIGURE 5 illustrating the outside housing and the reflector units.
Figures 5, 6, 7, 8:
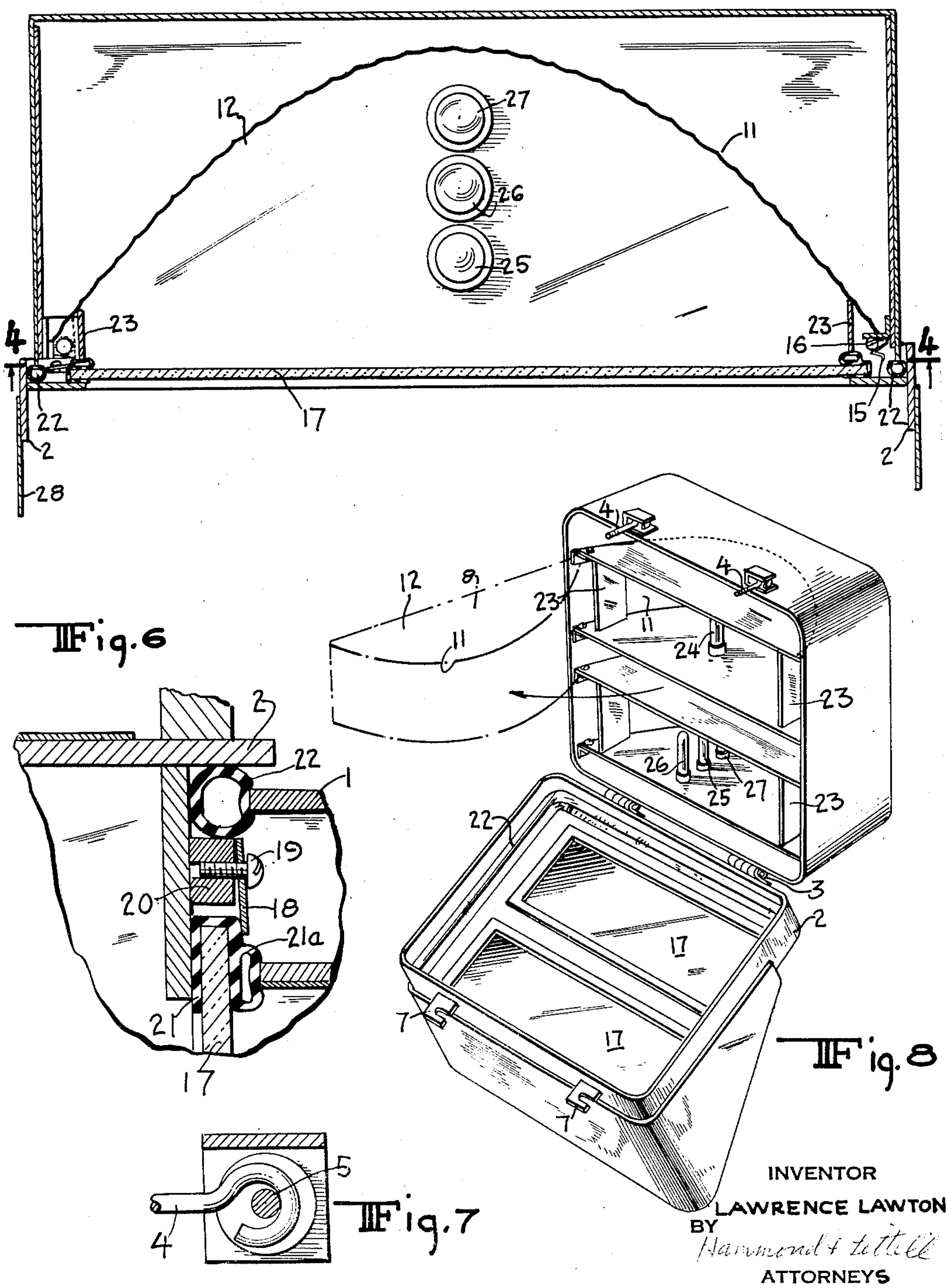
FIGURE 5 represents a sectional plan view along the lines 5—5 of FIGURE 2 showing the vertical parabolic reflector and the three bulbs of the lower reflector unit.
FIGURE 6 represents an enlarged cross sectional view of one side of the front cover in a closed position showing the means for attaching the stencil to the cover and the gaskets for providing a weather tight closure for the light casing.
FIGURE 7 illustrates a top view of the attachment for the eye bolts used to close the front cover along the line 7—7 of FIGURE 2.
FIGURE 8 shows a perspective view of the traffic light signal with the front cover swung forward to open position and illustrates both the top and bottom reflector units in a closed position. The top reflector unit is further shown in phantom in an open position.
Figure 15:
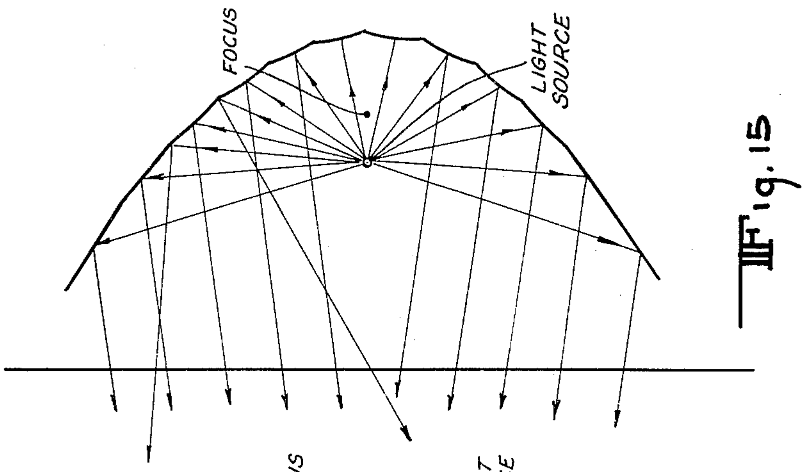
FIGURE 15 illustrates the spread of the light flux from a light source placed in front of the focus of a parabola.
Figure 14:
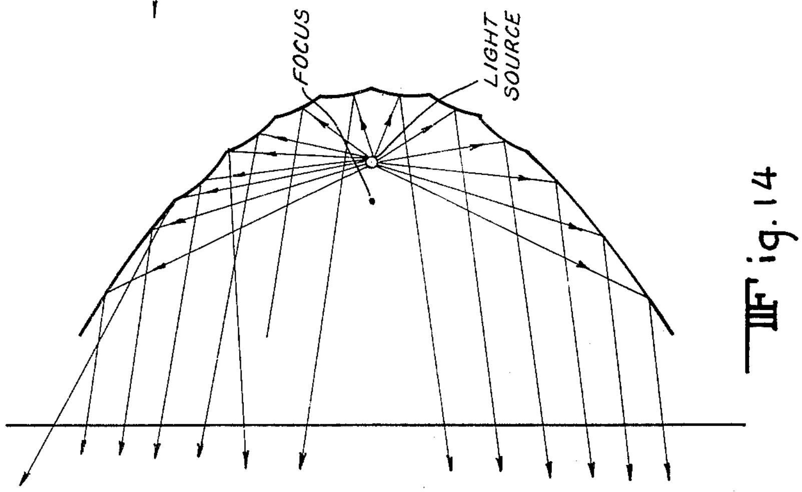
FIGURE 14 illustrates the distribution of the light flux from a light source placed behind the focus of a parabola.
Figure 13:
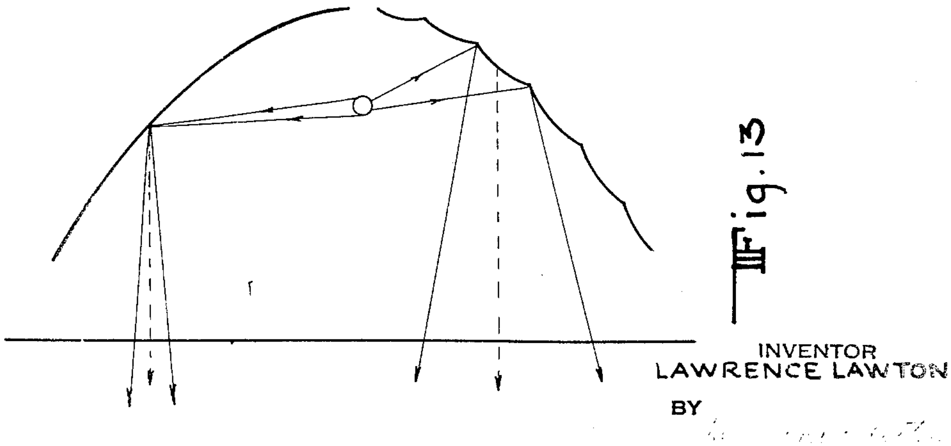
FIGURE 13 illustrates the light pattern caused by a light source placed at the focus of a parabolic reflector. The upper half of the figure illustrates a normal parabolic surface and the lower half illustrates a parabolic surface made of configurated surfaces.

Two reflector units 8 and 9 are positioned one above the other within housing 1. These reflector units are identical except for the number of light source receptacles 10. The upper reflector 8 has one receptacle whereas the lower reflector 9 has three receptacles. Each reflector unit consists of a vertical parabolic specular reflector surface 11 (FIGS. 4 and 5) having plane specular reflectors 12 attached to the top and bottom of the parabolic reflector surfaces. Parabolic surface 11 is a plane surface which forms a parabola whose focus is a vertical line (see FIGS. 5 and 8). Surface 11 may also consist of a series of connected, vertical plane surfaces, or similar connected curved surfaces as shown in FIGS. 13 to 15. Furthermore, surface 11 may also be given a parabolic curvature about a horizontal plane as shown in FIG. 2, as well as the curvature about a vertical plane. The light receptacles 10 are held by the lower plane reflecting surfaces 12. Each reflector unit has hinge pins 13 (FIG. 4) attached for supporting the units in housing 1. Pins 13 extend into holes of angle brackets 14 providing a pivotal mounting for each of the reflector units. The angle brackets 14 are mounted on a common mounting plate 14*a*. This arrangement permits a precise register between the gasket 21*a* (FIG. 6) mounted in the common cover 2 and the edges of the separate reflector units 8 and 9. The units may be removed from the housing by merely lifting them vertically to disengage the hinge pins 13 from the holes in brackets 14. As shown in FIGURE 8, each reflector unit may be swung in a horizontal direction about hinge posts 13 to gain access to the rear of the reflector unit and to the interior of housing 1. When the reflector units 8 and 9 are positioned within the housing 1 they are held in place by latch spring 15, attached to the inside of housing 1 which engages latch pin 16 attached to the reflector unit at the side opposite from the hinge pins.

The stencil plates 17 are placed on the inside of the front cover 2. These plates are held in place by a plurality of lens clips 18 which are fastened by screws 19 to plate clip support bars 20. The lens clip support bars 20 are preferably welded to the inside of cover 2 and also serve to provide additional strength for the cover. A gasket 21 having a hollow tubular portion 21*a* surrounds the perimeter of each plate. Another hollow gasket 22 is provided around the perimeter of the cover 2. Gaskets 21 and 22 simultaneously provide a weather tight seal as shown in FIGURE 6 when the cover is closed. Gasket 22 in this position engages the edge of housing 1 forming a seal for the entire housing. Gasket 21 engages forward edges of flat reflectors 12 and the edges of vertical plates 23 (FIG. 5) provided at each end of the vertical parabolic reflector surfaces 11 thus providing a dust tight seal closing off the interior of the reflector unit from the inside area of housing 1. The engagement of these edges creates a large bulging stress on the front cover 2. The use of more than two plates clips 18 on the long horizontal lengths of the plates clip support bars 20 causes the stencil lens 17 to act structurally in concert with the front cover 2 in resisting bulging.

The front elevation of the signal, showing the wording of the message panel, is seen at FIGURES 18 and 19. The message is formed by having the opaque stencil 53 covering the transparent glass screen 54 as illustrated in FIGURE 20. FIGURE 18 shows the signal during the prohibitory period when both "Don't" and "Walk" are illuminated in red. FIGURE 19 shows the signal during the permissive period when the "Don't" is unilluminated and the "Walk" is illuminated in green.

Describing in more detail an embodiment of the invention used as a pedestrian control device and having the words "Don't" on the upper stencil plate 17 and "Walk" on the lower stencil plate 17, the lower reflector unit 9 contains a vertical linear light source which may be of red color if this is the desired color for lighting the device during the prohibitory period. The vertical light source 24 in the upper reflector unit 8 is located at the focus of the vertical parabolic reflector 11. This light source may be an incandescent bulb.

With the vertical light source placed at the focus of a vertical parabolic reflector, a uniform distribution of the light flux is obtained over the entire surface of the stencil area. This will be apparent from FIGURE 13 where it is illustrated that a parabolic surface reflects light rays from a point source in a direction which is perpendicular to the face of the stencil, as shown by the dotted lines, so that the light flux will be concentrated on the stencil and not scattered randomly in all directions. Similarly the rays from a tubular source of light will be directed towards the stencil in the same manner as illustrated by the heavy lines. The lower portion of FIGURE 13 shows how a configurated parabolic reflector surface, such as connected curve surfaces, can be employed to achieve a predetermined beam spread. The horizontal beam spread is thus controlled by the use of the vertical parabolic reflector. As shown in FIGURE 2, the surface of reflector 11 may also be parabolic in the vertical cross section to provide control of the vertical spread of the light beam. The horizontal plane reflecting surfaces 12 are also used to provide uniform distribution of the light flux vertically over the stencil area and to control the beam spread in a vertical direction. Reflector unit 9 is similar in construction to reflector unit 8 with the exception of the arrangement of light sources. In reflector unit 9 there is, as in reflector unit 8, a vertical linear light source 25 placed at the focus of the parabola. This is a red light source 25 the same as used in reflector 8 and illuminates the lower stencil having the word "Walk." Light sources 24 and 25 are connected to operate simultaneously to illuminate both stencil areas and illuminate the signal "Don't Walk" in red during the prohibitory period.

In reflector unit 9, two other light sources 26 and 27 are placed along the axis of the parabola. Light 26 is placed forward of the focus and light 27 is placed to the rear of the focus. Lights 26 and 27 are green colored and are intended to light the lower stencil reading "Walk" during the permissive period, after the red lights have discontinued. Two light sources, one in front of and one to the rear of the focus have been used in order to obtain a uniform distribution of the light over the entire surface of the area of lower stencil 17. The reason for this may be understood by referring to FIGURES 14 and 15. In FIGURE 14 it may be seen that a light source located to the rear of the focus of a parabola will distribute the light flux in a divergent pattern. In FIGURE 15 it may be seen that a light source located at a point forward of the focus will distribute the light flux in a convergent pattern. Thus, the use of two overlapping light fluxes provides a uniform distribution over the entire stencil area. Since light source 25 lights up the stencil face by reflected light mainly, the position of light source 26 in front of it does not interfere with the distribution of the light flux on the stencil by light 25.

Figure 16:
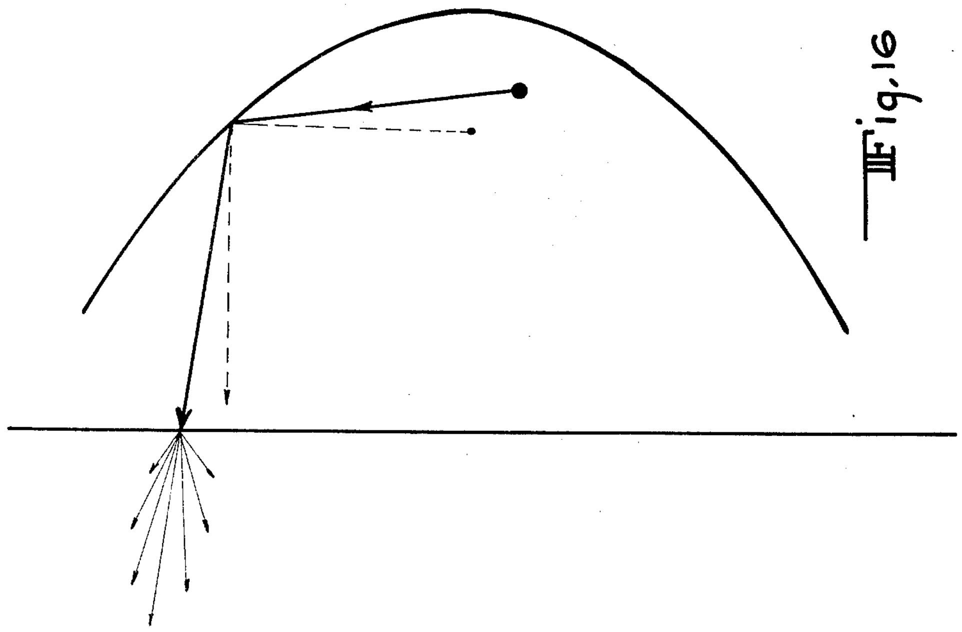
FIGURE 16 shows the spread of the light flux from a light source near the focus of a parabola and passing through a spread or moderately diffusing lens.

It is possible to create overlapping light fluxes without resorting to a configurated parabolic reflector. In FIGURE 16, a parabolic reflector is used in conjunction with a light emitter located near the focus of the reflector, and a spread or moderately diffusing stencil plate. The emitted light is gathered by the parabolic reflector and reflected to the surface of the spread or moderately diffusing stencil plate which spreads the light rays into a fan or elliptical shaped distribution. The use of a second light source of the same color also located near said focus, results in overlapping fluxes which provides a uniform distribution over the entire stencil area.

Figure 17:
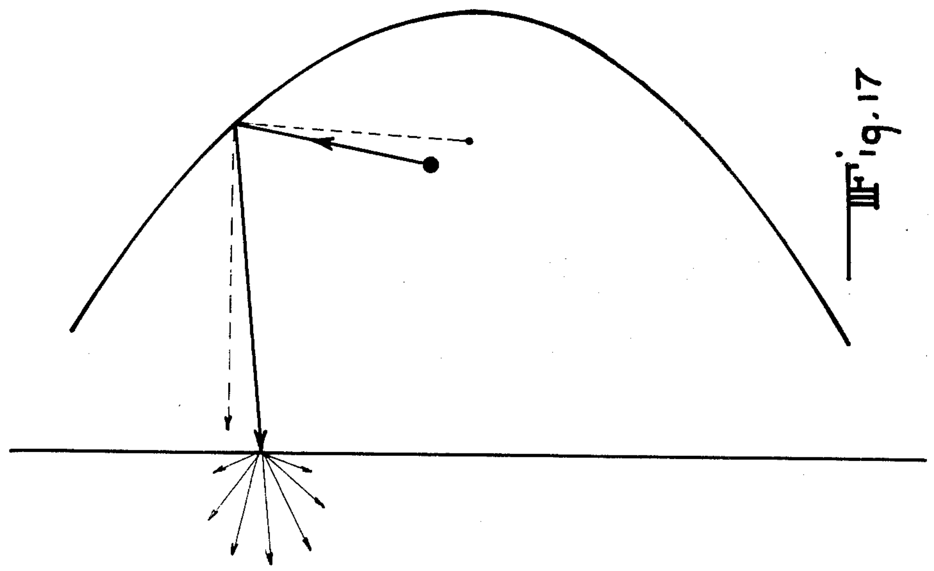
FIGURE 17 illustrates the distribution of the light flux from a light source near the focus of a parabola and passing through a dense diffusing stencil glass.

A dense diffusing stencil plate, as shown in FIGURE 17, spreads light rays into an extremely broad distribution pattern of lower intensity than a moderately diffusing stencil plate. This broad distribution makes it possible to achieve a fairly uniform intensity over the entire stencil area, of the light emitted from a single light source located near the focus of the reflector. The use of a second light source of a second color, also located near said focus, permits, in this case, a two color stencil.

It has been previously explained that a spherical parabolic reflector is less efficient in the lighting of a square or rectangular stencil than a reflector of constant parabolic section. With this in mind, it should be understood that the methods of obtaining a stencil in more than one color can also be applied in conjunction with a spherical parabolic reflector.

Reflecting surfaces 12, in the form of covers for the parabolic reflectors, have been provided to obtain an equal vertical distribution of light flux on the stencil face. A spread or diffuse stencil plate, or the use of a parabolic vertical cross section in reflector 11, further enhances the uniform vertical distribution of light flux.

It is preferable to connect the two light sources 24 and 25 in reflector units 8 and 9, so that should one bulb burn out the other bulb will also fail to light. Thus, there is no confusion resulting from the fact that during the prohibitory period only one of the red bulbs is burning. This is especially hazardous and confusing when the red bulb 24 in compartment 8 is burned out and only the red bulb 25 burns during the prohibitory period and the word "Walk" is illuminated in red. The illumination of this light stencil by light 25 during the prohibitory period could cause pedestrians to attempt to cross the street in the path of on-coming traffic during the prohibitory period. Thus, with the lights properly connected, when one light burns out neither bulb lights up and no mishaps can result. This also renders maintenance of the traffic light unit easier since it may readily be seen when the red bulbs are not operating. In like manner is is preferable to connect the green bulbs so that when one burns out neither operates and maintenance men may readily notice the need for replacement of the green bulb to maintain the proper intensity of illumination.

I can make use of three different methods of achieving positive protection against a dangerous indication. In the first electrical circuit arrangement, the light emitters are wired in series across a source of standard line voltage (approximately 120 volts). This arrangement is illustrated by the circuit diagram shown in FIGURE 22. The "Don't Walk" circuit is energized by the placement of line voltage across the input terminals 58 and 59. A red bulb 60 for the upper reflector is linked in series with a red bulb 61 of the lower reflector. Each of these bulbs is designed to operate at 60 volts. The individual operating voltage of each emitter is such that the sum of the individual operating voltages is equal to the standard line voltage. The second method employs light emitters operating at standard line voltage and wired in series across the high voltage end of a standard transformer. This arrangement is illustrated by the circuit diagram shown in FIGURE 23. The "Don't Walk" circuit is energized by applying line voltage to the low end terminals 62 and 63 of a standard 120 volt-240 volt transformer 64. The 240 volt output is fed to terminals 65 and 66. Linked in series across terminals 65 and 66 are a red bulb 67 for the upper reflector and a red bulb 68 for the lower reflector. Each of these bulbs operates at a standard line voltage. The high voltage is equal to the number of these different light emitters multiplied by standard line voltage.

While I have described the use of red and green colors in this traffic control signal, it will be readily apparent that other combinations of colors could be used, such as amber for the prohibitory period and white for the permissive period or other suitable combinations of colors. Moreover, it is entirely possible to connect the bulbs 25, 26 and 27 in another manner so that 26 and 27 correspond in color to 24 (e.g. red) and operate in connection therewith and bulb 25 is used as the second color bulb (e.g. green).

As will be seen from the illustration, the housing 1 is also provided with a light shade 28 to prevent excessive glare on the outer stencil plate surface from reflected sunlight.

Because a pedestrian signal functions in the public safety service, it is of essential importance that this device maintain its original level of light intensity. All of its parts should have maximum accessibility since a malfunctioning pedestrian signal must be quickly repaired, irrespective of inclement or hazardous weather conditions. My invention accomplishes these objectives by having the two rectangular reflectors in the same integral housing and associated with and bearing against the stencil-bearing door to form inner dust tight compartments. The opening of this common door permits immediate access to both reflector compartments. Each of these reflector compartments is pivoted from the integral housing so that quick access may be gained to the rear portion of the housing containing the electrical conditions. The stencil-bearing door may be pivoted at either side or the bottom of the housing. There may be partially interfering structures adjacent to the pedestrian signal and it therefore may be preferable to pivot the door about a horizontal edge of the housing.

This embodiment of my invention results in a number of advantages. The use of a horizontally elongated vertical parabolic reflector provides a large amount of reflective surface. The use of a vertical linear light source placed at the focus provides a maximum distribution of light flux in the most efficient manner. Since incandescent bulbs may be used, the traffic control device may operate on normally used voltages and there is no need for extremely high voltage or for special purpose transformers. An electrical "fail safe" is provided which precludes a dangerous "Walk" indication during the prohibitory period. Excellent protection of the interior of the signal is provided by gaskets in the cover which engage the perimeter of the casing and gaskets along the stencil plates which simultaneously engage the perimeter of the reflector units. Access to the interior of the unit may be gained by merely loosening the wing nuts 6 and draw bolts 4 and swinging the draw bolts to the side around posts 5. Cover 2 is then dropped forward pivoting on hinges 3. Reflector units 8 and 9 may be swung out to the side and the bulbs readily replaced by simply unscrewing the burned out bulb and screwing in the new bulb. Thus, the renewal of the light sources is extremely simple.

A further embodiment of my invention is illustrated in FIGURES 9, 10, 11 and 12. This embodiment is somewhat similar to the previous embodiment in that it involves a rectangular case having two stencils 17, one above the other in the cover. The present case consists of a rectangular rear compartment 29 having a central vertical plate divider 29*a* extending beyond the sides of compartment 29 and having a flange 29*b* attached (welded) to the edges of plate 29*a* and running around the entire perimeter of the rear compartment 29. A front compartment 29*c* and rear compartment 29 are formed by the separating plate 29*a*. Rear housing 29 has mountings, not shown, for attachment to a vertical supporting post and is thus stationary. Front housing 29*c* pivots on hinges 31 located on the bottom of flange 29*b* and divider plate 29*a* pivots on hinges 32 attached to base of rear housing 29. In this way access is gained to both the front compartment 29*c* and rear compartment 29. Gaskets 33 and 34 are provided around the perimeter of housings 29*c* and 29 respectively and form a weather tight seal when these housings are closed against the dividing plate 29*a*. The front housing is held in a closed position against central divider 29*a* and flange 29*b* by front draw bolts 35 passing through brackets 36 on housing 29*c* and 37 on flange 29*b*. The central divider 29*a* is held in place by bolts 38 passing through brackets 39 on flange 29*b* brackets 40 on housing 29. The brackets 36–37 and 39–40 may be offset so that the rear compartment 29 may be opened without opening the front compartment 29*c*. Stencil plates 17 are held in the front of housing 29*c* by plate clips 18 and plate clip support strips 20 in much the same manner as in the previous embodiment. A gasket 41 is fitted around each stencil plate to give a weather tight seal.

Figure 10:
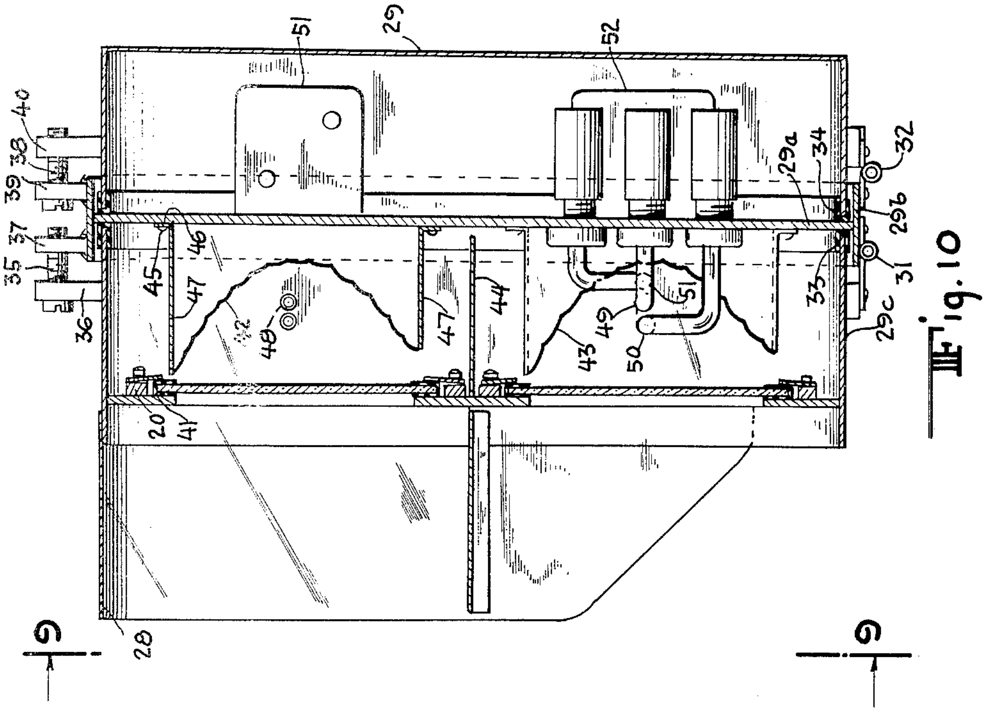
FIGURE 10 represents a side view in cross section taken along the lines 10—10 in FIGURE 9 of the embodiment of my invention utilizing horizontal reflectors and the neon light source.
Figure 9:
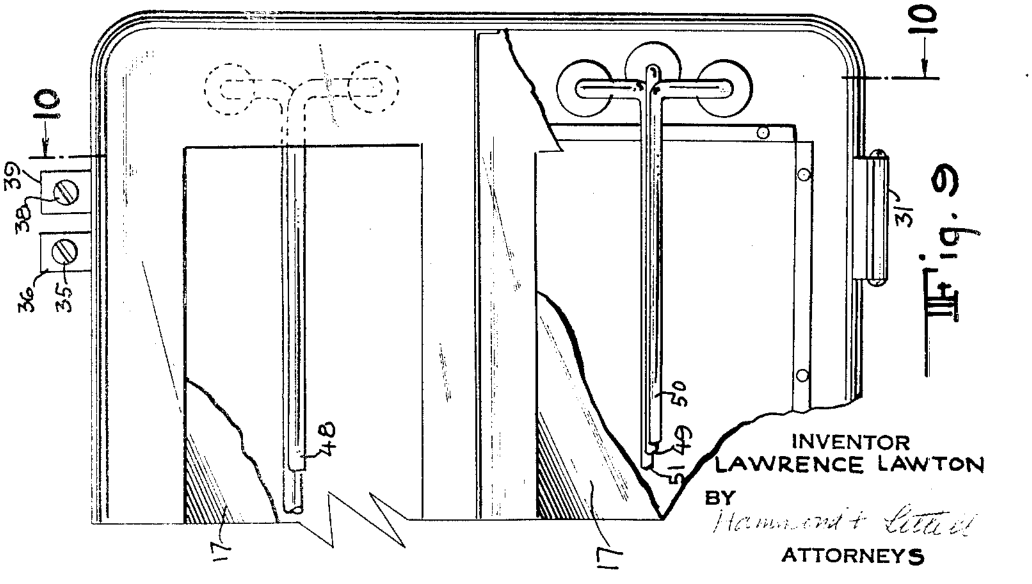
FIGURE 9 is a cross section view in part taken along the lines 9—9 in FIGURE 10 of the further embodiment of my invention using horizontal parabolic reflectors and neon tubing as the linear light source.

The reflectors 42 and 43 are elongated horizontal parabolic surfaces mounted on central divider plate 29*a*. Upper and lower compartments are separated by a transverse horizontal divider plate 44 also mounted in housing 29*c*. These reflectors may be configurated by such means as a series of flat surfaces or curved surfaces as shown in FIG. 10. The reflector supports 47 are attached by bolts 45 which are fastened through flanges 46 to the divider 29*a*. The reflector supports 47 extending around the reflectors 42 and 43 provide a dust tight enclosure for the area behind reflectors.

The preferred light sources for this embodiment of my traffic control signal are neon tubes. For use as a pedestrian signal displaying the words "Don't" on the upper stencil and "Walk" on the lower stencil, at least one horizontal red neon tube 48 is located at or near the focus of the parabolic surface of the upper reflector 42 a green neon tube 49 is located at the focus of the lower parabolic surface 43. In front of and to the rear of green tube 49 and in the same plane are located horizontal red neon tubes 50 and 51. The red neon tubes 48, 50 and 51 operate during the prohibitory period and illuminate the upper stencil showing the word "Don't"

and the lower stencil showing the word "Walk" in red. During the permissive period the green tube 49 is energized and reflects from lower reflector 43 and illuminates lower stencil 17 showing the word "Walk" in green color.

A complete coverage of upper stencil 17 is obtained since the red light sources 48 are located substantially at the focus of the parabola 42 and produces a uniform distribution of the light over the entire area of the stencil face. In the lower compartment, a complete coverage of the stencil face is obtained in the red color with red tubes located forward and to the rear of the focus of the parabola. As previously explained, the light source ahead of the parabola will result in a convergent flux and the light source to the rear of the stencil will result in a divergent flux giving uniform coverage of the stencil area.

The lower stencil 17 is also covered completely in the green color by having the green neon tube located at the focus of the parabola which provides distribution of the light flux over the entire stencil area. Tube 50 does not interfere with the direct light rays of tube 49 and cause a band of darkness in the center of the stencil. This is because the red tube 50 when not energized is transparently colorless and the green light rays of the energized tube 49 pass through the red tube 50. In a similar fashion, red tube 51 does not obstruct the passage of green light rays from tube 49 to reflector 43. By the use of a light emitter with a transparent and preferably colorless envelope, therefore, it is possible to obtain the use of two colors in one compartment while at the same time obtain the maximum utilization and distribution of the light flux. Transformers 51 and 52 are attached to the rear of divider **29*a* and energize the neon tubing. A light shade 28 is provided for the front of housing 29*c***.

Figures 11, 12:
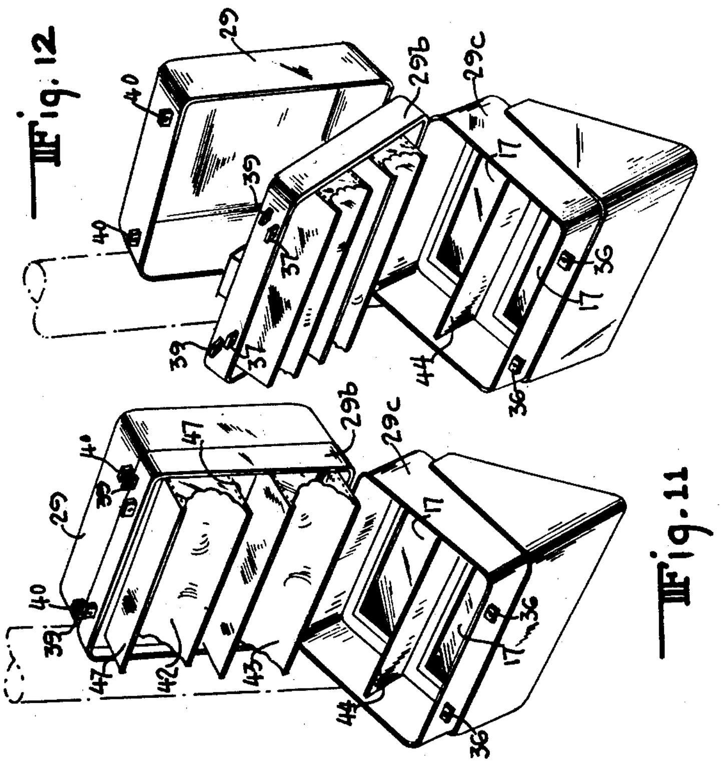
FIGURE 11 is a diagrammatic view of the further embodiment illustrated in FIGURES 9 and 10 showing the front housing open and the light reflectors and light sources.
FIGURE 12 illustrates a diagrammatic view of the traffic light signal similar to FIGURE 11 and showing both the front and back housings in an open position.
Figure 3:
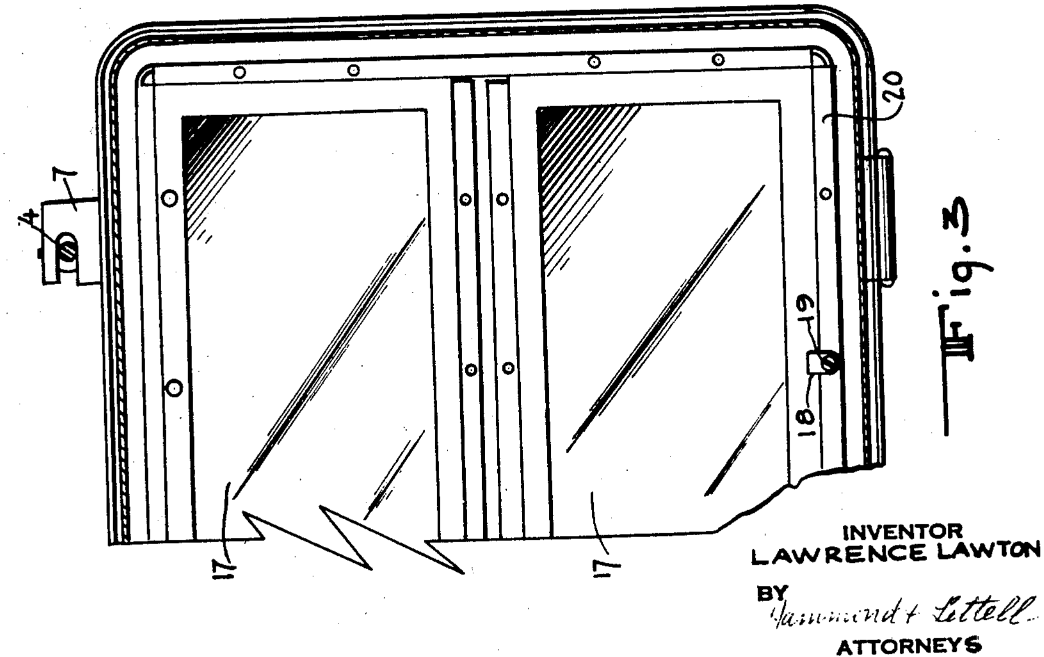
FIGURE 3 is a view on the line 3—3 of FIGURE 2 also broken at the mid point, showing the attachment of the stencil plates to the front cover.

All parts of the signal are readily accessible for maintenance. The front housing **29*c* can be dropped down as shown in FIGURE 11 by simply loosening bolts 35 to reach the reflectors and neon tubing for servicing. If it is necessary to gain access to the rear compartment to service the transformers on the rear of divider 29*a*, it is only necessary to loosen the draw bolts 38 holding the center divider 29*a* against the rear housing 29 and drop the center divider pivoting on hinge 32** whereby the transformers are exposed as shown in FIGURE 12. This construction permits complete servicing of the signal device from a front position without the removal of any doors, panels or the like, from the rear. Thus, all of the operating parts for the signal are readily accessible for servicing without the disassembly of any parts of a signal and without moving the servicing truck or ladder.

With the use of a stencil glass having an undulating cross section, I can obtain a sparkle effect. The use of a stencil glass with an undulating surface 55, as shown in FIG. 20, causes a visual distortion of the light on the stencil face. This changes in pattern upon movement of an observer, in much the same manner as a pane of poor quality window glass distorts and causes apparent movement of objects seen through the pane. This change in pattern, as viewed by a pedestrian through the transparent stroke portions 54 of the stencil legend, causes the strokes of the stencil legend to appear animated upon movement of the pedestrian. When the observer stops moving, the animation of the legend ceases. In a second way of obtaining a scintillating effect, the stencil message may be placed on a sheet of plate glass. A pattern of opaque bands 56 is superimposed on the stencil as illustrated in FIG. 21. FIG. 21 is a small portion of the upper "Don't" stencil showing the bottom half of the letter "O." The "O" is formed, as is the rest of the stencilled message, by an opaque stencil 53 covering the transparent glass screen 54. In this manner, all of the transparent stroke portions 54 of the message stencil are covered by a pattern of parallel opaque bands 56 alternating with the clear parallel portions 57. This pattern of opaque bands blocks out some of the parallel multiple images of the light sources appearing on the ribbed reflector 11. Movement of an observer causes different images to be blocked out from the observer's sight and also causes previously blocked out images to re-appear. This is much the same heterodyne effect as obtained by walking parallel to and looking through two adjacent rows of picket fences. With either of the two described methods of causing the signal to scintillate upon pedestrian movement, a new and powerful psychological tool is made available in traffic control applications.

While I have described my invention specifically as a pedestrian signal displaying the words "Don't Walk" it will be apparent that the signal may have other applications such as in the use of a "No Left Turn" signal or with other indicia on the stencils and other suitable arrangements of the lights in the compartments. For example, it is possible to place the three lights in the upper compartment and one light in the lower compartment if such an arrangement is desired, and in some applications it may be desirable to use three lights of the same color in one compartment which would more than double the intensity of the light flux. It will therefore be understood by persons skilled in the art that the above descriptions are only for the purpose of illustrating the invention and that various changes and modifications may be made without departing from the spirit of the invention and the scope of the following claims.

I claim:

1. A traffic signal comprising a housing, an upper and lower parabolic reflector within said housing, stencils on the front of said housing, a light source of a first color at the focus of the first parabolic reflector, a light source of said first color at the focus of the second reflector and at least one light source of a second color in spaced relationship to the focus of the second parabolic reflector, means to energize the light sources of the first color during one time interval, means to energize the light sources of the second color during another time interval whereby the stencils in front of both reflectors are illuminated by like colors during one time interval and the stencil in front of said second reflector is illuminated by another color during another time interval.

2. A traffic signal as specified in claim 1, in which the stencils are placed on a diffusing plate.

3. A traffic signal as specified in claim 1, in which the signal structure is comprised of an integral housing, a common stencil bearing door pivoting from the housing and closing the front of the housing and the two said parabolic reflectors are located inside the housing, the edges of the parabolic reflectors forming rectangles as viewed in front elevation, said parabolic reflectors pivoting from said housing, the edges of the reflectors being extended so as to bear against the common stencil bearing door forming separate dust tight compartments with the front edges of the housing simultaneously bearing on a door gasket.

4. A traffic signal as specified in claim 1, in which the light sources of said first color are wired in series across a source of line voltage, wherein the sum of the individual operating voltage of each said light source of the first color equals said line voltage.

5. A traffic signal as specified in claim 1, in which each of the light sources of said first color operates at line voltage and is wired in series across the high voltage output of a transformer, the high voltage being equal to the product of the number of light sources of said first color multiplied by line voltage.

6. A traffic signal as specified in claim 1, in which the light source of the second color has a transparent envelope, said second color being so positioned that a portion of the light flux of the first color passes through the transparent envelope of the second color.

7. A traffic signal as specified in claim 6 in which said parabolic reflectors are in the form of plane parabolic reflectors and said light sources are linear light sources.

8. A traffic signal as specified in claim 7 where the surface of said plane parabolic reflectors comprises a series of connected configurated surfaces.

9. A traffic signal comprising a housing, an upper and lower parabolic reflector within said housing, stencils on the front of said housing, at least one light source of a first color in spaced relationship to the focus of the first reflector, at least one light source of said first color in spaced relationship to the focus of the second parabolic reflector, a light source of a second color at the focus of said second parabolic reflector, means to energize the light sources of one color during one time interval, means to energize the light sources of the second color during another time interval whereby both stencils are illuminated by like colors during one time interval and the stencil in front of said second reflector is illuminated by another color during another time interval.

10. A traffic signal comprising a rectangular housing, an upper plane parabolic reflector and a lower plane parabolic reflector within said housing, linear stencils on the front of said rectangular housing coinciding with said reflectors, a light source in front of a first parabolic reflector comprising a linear light source located in the focal plane thereof, two separate light sources in front of a second parabolic reflector comprising a linear light source of a first color in the focal plane thereof and in spaced relationship to the focus and a linear light source of a second color in the focal plane and in a different spaced relationship to the focus of said second parabolic reflector, wherein one of said first and second colors is the same color as the light source in said first parabolic reflector, means to simultaneously energize the like colored light sources in front of both reflectors during one time interval, means to energize the other colored light source in said second reflector during another time interval, whereby both stencils are illuminated by like colors during one time interval and the stencil in front of said second reflector is illuminated by another color during another time interval.

11. A traffic signal comprising a rectangular housing, an upper plane parabolic reflector and a lower plane parabolic reflector within said housing, linear stencils on the front of said rectangular housing coinciding with said reflectors, linear light sources of a first color at the foci of said upper and lower reflectors, two linear light sources of a second color in said lower reflector in the focal plane of said reflector, one in front of and one behind the focus, means to energize said linear light sources of said first color, at the foci of the reflectors during a given time interval, means to energize said linear light sources of said second color in the lower reflector during another time interval, whereby both of said stencils are illuminated by said first color during one time interval and said lower stencil is illuminated by said second color during another time interval.

12. A pedestrian control signal comprising a rectangular housing open at the front, a front cover having an upper and lower linear stencil, said upper stencil carrying the word "Don't" and said lower stencil carrying the word "Walk," an upper and lower plane parabolic reflector within said housing, a linear light source of a first color at the focus of said upper reflector and a linear light source of said first color at the focus of said lower reflector, two linear light sources of a second color in said lower reflector in the focal plane thereof, one of said linear light sources being in front of the focus, the other being behind the focus, means to energize the linear light sources of said first color in the upper and lower reflectors to illuminate the words "Don't Walk" during a prohibitory period, and means to energize the light sources of said second color in the lower reflector to illuminate the word "Walk" during a permissive period.

13. The control signal of claim 12 in which all said light sources are incandescent filaments.

14. A pedestrian control signal comprising a rectangular housing open at the front, a front cover having an upper and lower linear stencil, said upper stencil carrying the word "Don't" and said lower stencil carrying the word "Walk," upper and lower vertical plane parabolic reflectors within said housing, a vertical linear light source of a first color at the focus of said upper reflector and a vertical linear light source of said first color at the focus of said lower reflector, two vertical linear light sources of a second color in said lower reflector in the focal plane thereof, one of said linear light sources being in front of the focus, the other being behind the focus, means to energize the linear light sources of said first color in the upper and lower reflectors to illuminate the words "Don't Walk" during a prohibitory period, and means to energize the light sources of said second color in the lower reflector to illuminate the word "Walk" during the permissive period.

15. The pedestrian control signal comprising a rectangular housing open on the front side, a front cover means pivoted on its lower edge, said cover carrying an upper and lower linear stencil having the word "Don't" on the upper stencil and the word "Walk" on the lower stencil, upper and lower reflector compartments located within said housing, each compartment comprising a vertical parabolic reflector and a plane upper reflector, a vertical linear red light source at the focus of said upper reflector compartment and a vertical linear red light source at the focus of said lower reflector compartment, two vertical linear green light sources in said lower reflector compartment in the focal plane of the parabolic reflector, one of said green light sources being in front of the focus and the other behind the focus, means to energize said red light sources during the prohibitory period to light up both the "Don't" and "Walk" stencils, means to energize said green light sources to light up the "Walk" stencil during the permissive period.

16. The pedestrian control signal comprising a rectangular housing open on the front side, a front cover means pivoted on its lower edge, said closing means carrying an upper and lower linear stencil having the word "Don't" on the upper stencil and the word "Walk" on the lower stencil, upper and lower reflector compartments located within said housing, each compartment comprising a vertical parabolic reflector and plane upper and lower reflectors, a vertical linear red light source at the focus of said upper reflector compartment, a vertical linear green light source at the focus of said linear lower reflector compartment, two vertical linear red light sources in said lower reflector compartment in the focal plane of the parabolic reflector, one of said red light sources being in front of the focus and the other behind the focus, means to energize said red light sources during the prohibitory period to light up both the "Don't" and "Walk" stencils, means to energize said green light sources to light up the "Walk" stencil during the permissive period.

17. The pedestrain control signal comprising a rectangular housing open on the front side, a front cover means pivoted on its lower edge, said cover carrying an upper and lower linear stencil having the work "Don't" on the upper stencil and the word "Walk" on the lower stencil, upper and lower reflector compartments located within said housing, each compartment comprising a vertical parabolic reflector made up of a series of connected surfaces, and plane upper and lower reflectors, pivot means at one side of each reflector compartment to pivot said compartment out of the housing in a horizontal plane, latch means on said opposite end of each compartment for holding the compartments within said housing, means for providing a weather tight fit between said cover and said housing comprising a gasket on said cover which engages the periphery of said housing and gaskets along each stencil which engage the periphery of each reflector compartment when the cover is in a closed position, means to secure said cover in a closed position, a vertical linear red light source at the focus of said upper reflector compartment and a vertical linear red light source at the focus of said lower reflector compartment, two vertical linear green light sources in said lower reflector compartment in the focal plane of the parabolic reflector, one of said green light sources being in front of and the other behind the focus, means to energize said red light sources during the prohibitory period to light up both the "Don't" and "Walk" stencils, and means to energize said green light sources to light up the "Walk" stencil during the permissive period.

18. In a pedestrian control signal having a rectangular housing with upper and lower linear stencils on the front face thereof with the word "Don't" on said upper stencil and the word "Walk" on said lower stencil, a rectangular rear housing open at the front, a central panel pivoted on the lower edge thereof from the lower edge of said rear housing, an upper and lower parabolic reflector mounted on the front of said central panel, a front housing carrying said stencils and pivoted on its lower edge thereof and on the lower edge of the central panel, a horizontal divider between said stencils which fits between the upper and lower reflectors in a closed position, a red linear light source in front of said upper parabolic reflector and at the focus thereof, a green linear light source at the focus of the said lower parabolic reflector, two red linear light sources in the focal plane of said lower parabolic reflector one to the front and one in back of the focus thereof, means mounted on the rear of said central panel for energizing the light sources whereby the red colored light sources are simultaneously energized to illuminate both upper and lower stencil faces to show the words "Don't Walk" in red during the prohibitory period and the green color light sources are energized during the permissive time period to illuminate the lower stencil letters "Walk" in green.

19. In a pedestrian control signal having a rectangular housing with upper and lower linear stencils on the front face thereof with the word "Don't" on said upper stencil and the word "Walk" on said lower stencil, a rectangular rear housing open at the front, a central panel pivoted on the lower edge thereof from the lower edge of said rear housing, an upper and lower horizontal parabolic reflector mounted on the front of said central panel, a front housing carrying said stencils and pivoted on its lower edge thereof and on the lower edge of the central panel, a horizontal divider between the stencils which fits between the upper and lower reflectors, in a closed position, a red linear light source in front of said upper parabolic reflector and at the focus thereof, a green linear light source at the focus of the said lower parabolic reflector, two red linear light sources in the focal plane of said lower parabolic reflector one to the front and one in back of the focus thereof, means mounted on the rear of said central panel for energizing the light sources whereby the red colored light sources are simultaneously energized to illuminate both upper and lower stencil faces to show the words "Don't Walk" in red with said first color during the prohibitory period and the green light sources are energized during the permissive period to illuminate the lower stencil letters "Walk" in green.

20. In a pedestrian control signal having the rectangular housing with upper and lower linear stencils on the face thereof, a rectangular rear housing open at the front, a central panel pivoted on the lower edge from said rear housing, an upper and lower parabolic reflector consisting of a series of connected surfaces mounted on the front of said central panel, a front housing pivoted on its lower edge and on the lower edge of the central panel, a horizontal divider between the stencil and the said front housing which fits between the upper and lower reflectors in a closed position, two linear light sources of a first color in the focal plane of said upper parabolic reflector, one to the front and one in back of the focus thereof, a linear light source of a second color at the focus of the said lower parabolic reflector, two linear light sources of said first color in the focal plane of said lower parabolic reflector one to the front and one in back of the focus thereof, means mounted on the rear of said central panel for energizing the light sources whereby the first colored light sources are simultaneously energized to illuminate both upper and lower stencil faces with said first color during the given time interval and said second color light sources are energized during another time interval to illuminate the lower stencil with said second color.

21. In a pedestrian control signal having the rectangular housing with upper and lower linear stencils on the face thereof, a rectangular rear housing open at the front, a central panel pivoted on the lower edge from said rear housing, an upper and lower parabolic reflector consisting of a series of connected curved surfaces mounted on the front of said central panel, a front housing pivoted on its lower edge and on the lower edge of the central panel, a horizontal divider between the stencil and the said front housing which fits between the upper and lower reflectors in a closed position, a linear light source of a first color in front of said upper parabolic reflector and at the focus thereof, a linear light source of said first color at the focus of the said lower parabolic reflector, two linear light sources of a second color in the focal plane of said lower parabolic reflector one to the front and one in back of the focus thereof, means mounted on the rear of said central panel for energizing the light sources whereby the first colored light sources are simultaneously energized to illuminate both upper and lower stencil faces with said first color during the given time interval and said second color light sources are energized during another time interval to illuminate the lower stencil with said second color.

22. In a traffic light signal comprising a housing, a stencil located on the front surface of the housing, a reflector and associated light source located behind the stencil a reflector unit for providing different colors of illumination to said stencil which comprises, a vertical plane parabolic reflector, plane reflectors across the top and bottom of said parabolic reflector, a vertical linear light source of a first color at the focus of said parabolic reflector, two vertical linear light sources of a second color in the focal plane of said parabolic reflector, one in front of and one behind the focus thereof, means to energize said first colored light source during a first time interval, means to energize said second colored light source during a second time interval whereby said stencil is illuminated with the first color during the first time interval and the second color during the second time interval, and means whereby a uniform distribution of the light flux over the stencil area is obtained with both of said colors.

23. In a traffic light signal comprising a housing, a stencil located on the front surface of the housing, a reflector and associated light source located behind the stencil, a reflector unit for providing different colors of illumination to said stencil which comprises, a vertical plane parabolic reflector comprising a series of connected plane surfaces, plane reflectors across the top and bottom of said parabolic reflector, a vertical linear light source of a first color at the focus of said parabolic reflector, two vertical linear light sources of a second color in the focal plane of said parabolic reflector, one in front of and one behind the focus thereof, means to energize said first colored light source during a first time interval, means to energize said second colored light source during a second time interval whereby said stencil is illuminated with the first color during the first time interval and the second color during the second time interval, and a uniform distribution of the light flux over the stencil area is obtained with both of said colors.

24. In a traffic light signal comprising a housing, a stencil, a reflector and a light source, a reflector unit for providing different colors of illumination to said stencil which comprises, a vertical plane parabolic reflector comprising a series of connected curved surfaces, plane reflectors across the top and bottom of said parabolic reflector enclosing the open areas thereof, a vertical linear light source of a first color at the focus of said parabolic reflector, two vertical linear light sources of a second color in the focal plane of said parabolic reflector, one in front of and one behind the focus thereof, means to energize said first colored light source during a first time interval, means to energize said second colored light source during a second time interval whereby said stencil is illuminated with the first color during the first time interval and the second color during the second time interval, and a uniform distribution of the light flux over the stencil area is obtained with both of said colors.

25. In a traffic light signal comprising a housing, a stencil located on the front surface of the housing, a reflector and associated light source located behind the stencil a reflector unit for providing different colors of illumination to said stencil which comprises, a vertical parabolic reflector having a relatively long horizontal dimension and a short vertical dimension and having a horizontal parabolic curvature, plane reflectors across the top and bottom of said parabolic reflector enclosing the open areas thereof, a vertical linear light source of a first color at the focus of said parabolic reflector, two vertical linear light sources of a second color in the focal plane of said parabolic reflector, one in front of and one behind the focus thereof, means to energize said first colored light source during a first time interval, means to energize said second colored light source during a second time interval whereby said stencil is illuminated with the first color during the first time interval and the second color during the second time interval, and means whereby a uniform distribution of the light flux over the stencil area is obtained with both of said colors.

References Cited in the file of this patent

UNITED STATES PATENTS

| | | |
|---|---|---|
| 1,409,469 | Reece | Mar. 14, 1922 |
| 1,555,410 | Godley | Sept. 29, 1925 |
| 1,665,276 | Pfeifer | Apr. 10, 1928 |
| 1,923,181 | Albers | Aug. 22, 1933 |
| 2,142,384 | Taylor | Jan. 3, 1939 |
| 2,229,611 | Levitan | Jan. 21, 1941 |
| 2,294,883 | Anderson | Sept. 8, 1942 |
| 2,337,833 | Pahl | Dec. 28, 1943 |
| 2,344,327 | Runge | Mar. 14, 1944 |
| 2,616,957 | Thiem | Nov. 4, 1952 |
| 2,700,145 | Stehlik | Jan. 18, 1955 |
| 2,793,356 | Hart | May 21, 1957 |

FOREIGN PATENTS

| | | |
|---|---|---|
| 582,860 | France | Oct. 22, 1924 |